(12) United States Patent
Chang et al.

(10) Patent No.: US 8,854,335 B2
(45) Date of Patent: Oct. 7, 2014

(54) ELECTRONIC APPARATUS HAVING TOUCH SENSING ABILITY AND NON-TOUCH SENSING ABILITY AND CONTROL METHOD THEREOF

(71) Applicant: Eminent Electronic Technology Corp. Ltd., Hsinchu (TW)

(72) Inventors: Tom Chang, Taipei (TW); Kao-Pin Wu, New Taipei (TW); Chih-Jen Fang, Tainan (TW); Cheng-Ta Chuang, New Taipei (TW)

(73) Assignee: Eminent Electronic Technology Corp. Ltd., Hsinchu Science Park, Hsinchu (TW)

( * ) Notice: Subject to any disclaimer, the term of this patent is extended or adjusted under 35 U.S.C. 154(b) by 71 days.

(21) Appl. No.: 13/848,741

(22) Filed: Mar. 22, 2013

(65) Prior Publication Data

US 2013/0249861 A1  Sep. 26, 2013

Related U.S. Application Data

(60) Provisional application No. 61/614,071, filed on Mar. 22, 2012.

(30) Foreign Application Priority Data

Mar. 21, 2013 (TW) ............................ 102110057 A

(51) Int. Cl.
*G06F 3/041* (2006.01)
*G06F 3/03* (2006.01)
*G06F 3/0488* (2013.01)
*G06F 3/01* (2006.01)

(52) U.S. Cl.
CPC ............ *G06F 3/0412* (2013.01); *G06F 3/0304* (2013.01); *G06F 3/04883* (2013.01); *G06F 3/017* (2013.01)
USPC ............ 345/174; 345/158; 345/173; 715/863

(58) Field of Classification Search
CPC ...... G06F 3/0421; G06F 3/0488; G06F 3/042
USPC ........... 345/156–157, 173–179, 158; 715/863
See application file for complete search history.

(56) References Cited

U.S. PATENT DOCUMENTS

2010/0104134 A1*  4/2010  Wang et al. .................... 382/103
2014/0055386 A1*  2/2014  Duheille ........................ 345/173

* cited by examiner

*Primary Examiner* — Lun-Yi Lao
*Assistant Examiner* — M D Saiful A Siddiqui
(74) *Attorney, Agent, or Firm* — Winston Hsu; Scott Margo

(57) ABSTRACT

A control method of an electronic apparatus includes the following steps: detecting a touch sensing event to generate a touch detection result; detecting a non-touch sensing event to generate a non-touch detection result; and enabling the electronic apparatus to perform a specific function according to at least the touch detection result and the non-touch detection result. An electronic apparatus includes a touch detection unit, a non-touch detection unit and a control unit. The touch detection unit is arranged to detect a touch sensing event to generate a touch detection result. The non-touch detection unit is arranged to detect a non-touch sensing event to generate a non-touch detection result. The control unit is coupled to the touch detection unit and the non-touch detection unit, and is arranged to enable the electronic apparatus to perform a specific function according to at least the touch detection result and the non-touch detection result.

17 Claims, 11 Drawing Sheets

ELECTRONIC APPARATUS HAVING TOUCH SENSING ABILITY AND NON-TOUCH SENSING ABILITY AND CONTROL METHOD THEREOF

CROSS REFERENCE TO RELATED APPLICATIONS

This application claims the benefit of U.S. provisional application No. 61/614,071, filed on Mar. 22, 2012, the contents of which are incorporated herein by reference.

BACKGROUND OF THE INVENTION

1. Field of the Invention

The disclosed embodiments of the present invention relate to an electronic touch apparatus, and more particularly, to a control method of an electronic apparatus, which includes a touch sensing unit as well as a non-touch sensing unit, and a related electronic apparatus.

2. Description of the Prior Art

Most mobile devices which have touch screens include mechanical buttons for the purposes of locking or unlocking the touch screen (i.e. lock/unlock buttons), returning the operation menu to the "home" menu (i.e. home menu buttons), and resetting the software function to default settings (i.e. reset buttons). These mechanical buttons increase the overall area of the mobile device, thus occupying available space which could be used for other devices, as well as indirectly restricting the size of the touch screen. Additionally, touch-based push button operations may shorten the product life of the mechanical buttons.

Some of these mobile devices (e.g. smart phones) are also equipped with proximity sensors, which use the distance between the phone and the user's face (or ear) to turn off the touch-screen sensor in order to prevent accidental triggering of the touch-screen functions, as well as turning off the screen back light to extend the battery time. When using the proximity sensor to control the mobile device, the user needs to perform large gestures to control the mobile device precisely, due to the operating principles and hardware characteristics of the non-touch sensing mechanism. That is, non-touch gestures have limited variety. For example, when the user performs a "double tap" non-touch gesture to control the mobile device, the moving range of the user's hand needs to be large enough for the mobile device to recognize the "double tap" command.

Thus, a novel electronic apparatus is needed to solve the problems caused by the mechanical buttons and non-touch sensing mechanism.

SUMMARY OF THE INVENTION

It is therefore one objective of the present invention to provide a control method of an electronic apparatus, which includes a touch sensing unit as well as a non-touch sensing unit, and a related electronic apparatus to solve the above problems.

According to an embodiment of the present invention, an exemplary control method of an electronic apparatus is disclosed. The exemplary control method comprises the following steps: detecting a touch sensing event to generate a touch detection result; detecting a non-touch sensing event to generate a non-touch detection result; and enabling the electronic apparatus to perform a specific function according to at least the touch detection result and the non-touch detection result.

According to an embodiment of the present invention, an exemplary electronic apparatus is disclosed. The exemplary electronic apparatus comprises a touch detection unit, a non-touch detection unit and a control unit. The touch detection unit is arranged to detect a touch sensing event to generate a touch detection result. The non-touch detection unit is arranged to detect a non-touch sensing event to generate a non-touch detection result. The control unit is coupled to the touch detection unit and the non-touch detection unit, and is arranged to enable the electronic apparatus to perform a specific function according to at least the touch detection result and the non-touch detection result.

The present invention provides an electronic apparatus integrating touch sensing with non-touch sensing and a control method thereof. The proposed method can enable the electronic apparatus to perform a variety of functions according to combined gestures realized by touch gestures and non-touch gestures, to thereby save space otherwise occupied by physical buttons. In addition, the integration of the touch sensor controller with the non-touch sensor controller can greatly reduce the production costs and improve the operating efficiency.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a method to control an electronic apparatus, which is capable of detecting a touch sensing event and a non-touch sensing event to thereby perform a variety of specific functions, wherein the electronic apparatus may refer to touch detection information (corresponding to the touch sensing event) as well as non-touch detection information (corresponding to the non-touch sensing event) to perform the specific functions. The respective detection information may include, but is not limited to, trigger position and motion of the corresponding sensing event, trigger time of the corresponding sensing event, detection signal intensity, and/or relationship between the detection signal and time. Further description is detailed as follows.

Figure 1:
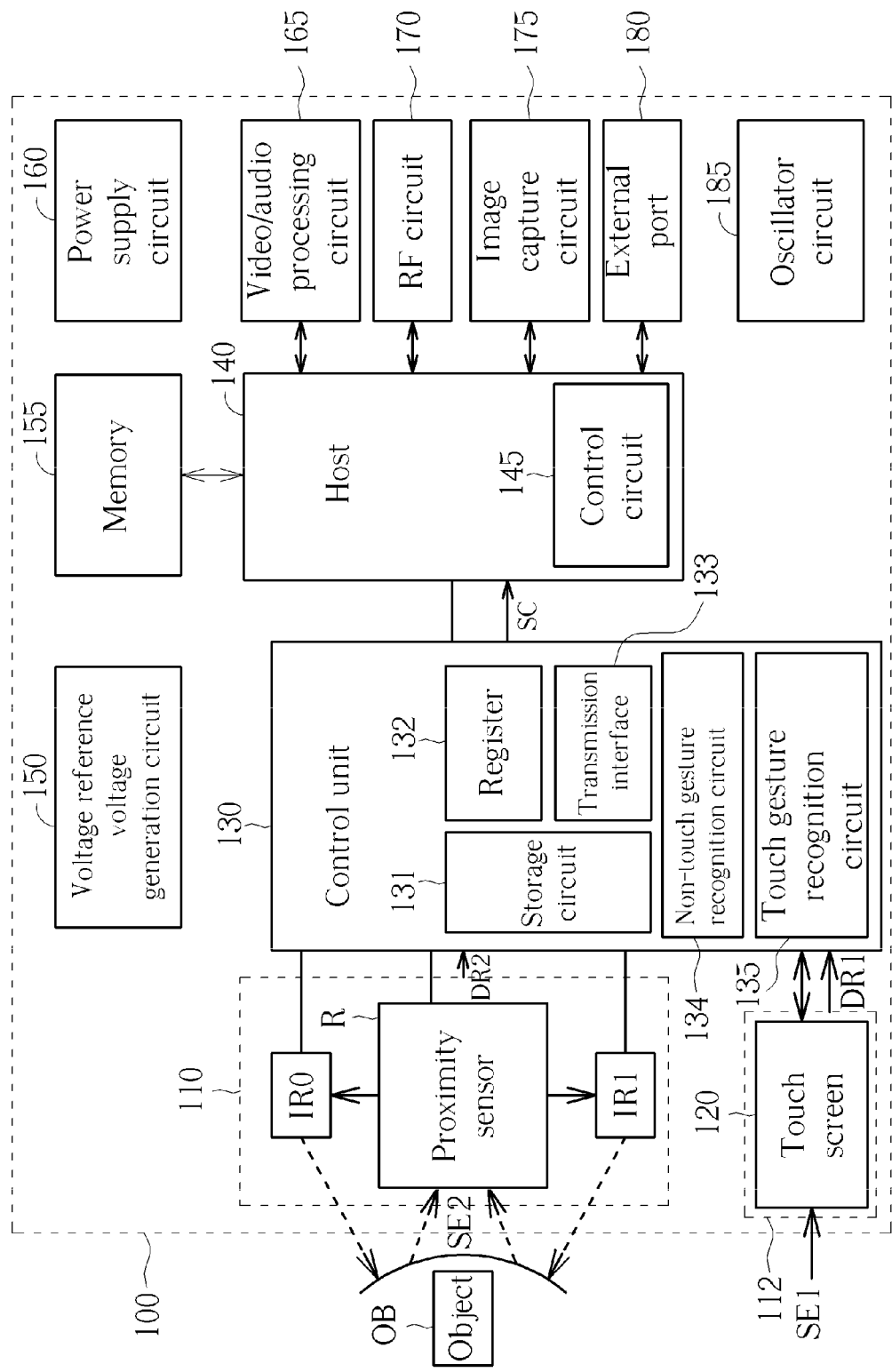
FIG. 1 is a block diagram illustrating an exemplary electronic apparatus according to an embodiment of the present invention.

Please refer to FIG. 1, which is a block diagram illustrating an exemplary electronic apparatus according to an embodiment of the present invention. The electronic apparatus 100 may include, but is not limited to, a plurality of infrared (IR) emitters IR0 and IR1 (e.g. an IR light emitting diode (IR LED) or an IR laser LED), a proximity sensor R, a touch screen 120, a control unit 130, a host 140, a voltage reference voltage generation circuit 150, a memory 155, a power supply circuit 160, a video/audio processing circuit 165, a radio frequency (RF) circuit 170, an image capture circuit 175, an external port 180 and an oscillator circuit 185. In this embodiment, the IR emitters IR0 and IR1 and the proximity sensor R are used to implement a non-touch detection unit 110, and the touch screen 120 is used to implement a touch detection unit 112. Please note that the above implementations of the non-touch detection unit 110 and the touch detection unit 112 are for illustrative purposes only, and are not meant to be limitations of the present invention. In an alternative design, the non-touch detection unit 110 may be implemented by an ambient light sensing device or an acoustic sensing device. In another alternative design, the touch detection unit 112 may be implemented by a pressure sensing device.

In view of the above description, the electronic apparatus 100 may detect a touch sensing event (by utilizing the touch detection unit 112) and a non-touch sensing event (by utilizing the non-touch detection unit 110). By triggering the touch sensing event and the non-touch sensing event, the user may control the operation of the electronic apparatus 100 (e.g. performing a specific function).

Figure 2:
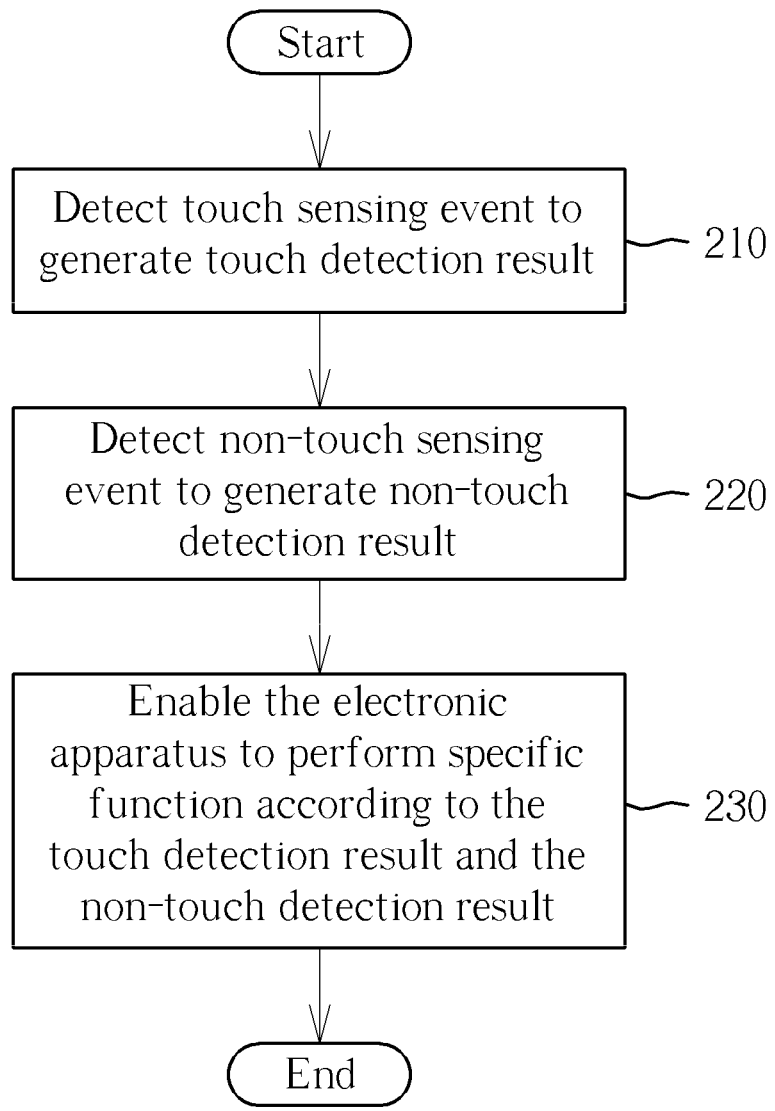
FIG. 2 is a flowchart of an exemplary control method of an electronic apparatus according to an embodiment of the present invention.

Please refer to FIG. 2 in conjunction with FIG. 1. FIG. 2 is a flowchart of an exemplary control method of an electronic apparatus according to an embodiment of the present invention, wherein the exemplary control method may be employed in the electronic apparatus 100 shown in FIG. 1. First, the user may touch the touch screen 120 to trigger a touch sensing event SE1 (e.g. a single tap or double tap). The touch screen 120 may detect the touch sensing event SE1 to generate a touch detection result DR1 (e.g. information of finger touch position) in step 210. The user may further use an object OB (e.g. a hand) to trigger a non-touch sensing event SE2 (e.g. waving the hand from side to side or drawing a circle) above the electronic apparatus 100. As light emitted from the IR emitters IR0 and IR1 may be reflected by the object OB to the proximity sensor R, the proximity sensor R may detect the non-touch sensing event SE2 according to positions of the IR emitters IR0 and IR1, and accordingly generate a non-touch detection result DR2 (e.g. a relationship between time and reflected signal intensity corresponding to IR emitters at different positions) in step 220. Next, a touch gesture recognition circuit 135 included in the control unit 130 may recognize the touch detection result DR1 to generate a touch gesture recognition result, and a non-touch gesture recognition circuit 134 included in the control unit 130 may recognize the non-touch detection result DR2 to generate a non-touch gesture recognition result. The control unit 130 may enable the electronic apparatus 100 to perform the specific function according to the touch gesture recognition result and the non-touch gesture recognition result.

In one implementation, the electronic apparatus 100 may be implemented by a portable electronic apparatus (e.g. a mobile phone). In a case where the electronic apparatus 100 is operated in a video playback mode and the specific function is a fast forward function, the control unit 130 may generate a control signal SC to the host 140 according to the touch detection result DR1 (or the touch gesture recognition result) and the non-touch detection result DR2 (or the non-touch gesture recognition result), and the host 140 may enable the video/audio processing circuit 165 to perform a fast forward operation according to the control signal SC. As a person skilled in the art should understand the operation of elements coupled to the host 140, such as the memory 155, the video/audio processing circuit 165, the RF circuit 170, the image capture circuit 175 and the external port 180 (e.g. a universal serial bus (USB) port), further description is omitted here for brevity. In addition, the voltage reference voltage generation circuit 150 and the power supply circuit 160 are arranged to supply power required by the electronic apparatus 100, and the oscillation circuit 185 is arranged to provide clock signal(s).

As shown in FIG. 1, a circuit for controlling the touch screen 120 and a circuit for controlling the proximity sensor R are integrated in the control unit 130, wherein a storage circuit 131 (e.g. a read-only memory (ROM) and a random access memory (RAM)), a register 132 and a transmission interface 133 included in the control unit 130 may be shared by the touch sensing and the non-touch sensing. The control unit 130 may be implemented by an application specific integrated circuit (ASIC) or a microcontroller unit (MCU). Additionally, the touch sensing and the non-touch sensing may share the voltage reference voltage generation circuit 150, the power supply circuit 160 and the oscillation circuit 185. In view of the above description, the architecture of the proposed electronic apparatus may free up valuable circuit board space and reduce communication overhead. Moreover, low production cost, fast report rate and high operating efficiency may be achieved.

The recognition functions of non-touch gesture recognition circuit 134 and the touch gesture recognition circuit 135 may be implemented in software. For example, the control unit 130 may use algorithm(s) to recognize the touch detection result DR1 and the non-touch detection result DR2, thereby generating a corresponding control signal (or command) to enable the electronic apparatus 100 to perform the specific function.

Figure 3:
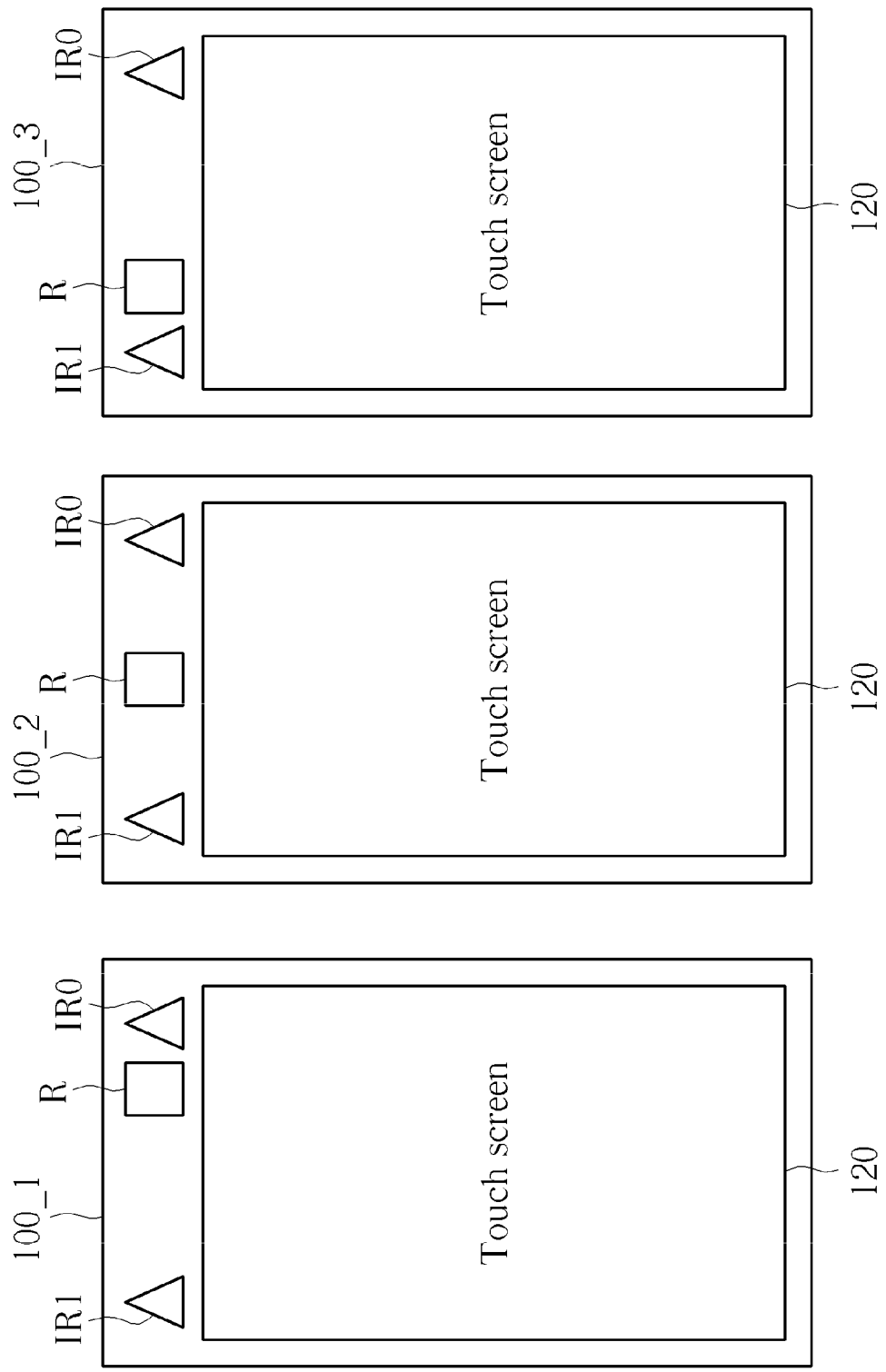
FIG. 3 is a diagram illustrating a first implementation of the IR emitters and the proximity sensor shown in FIG. 1.
Figure 4:
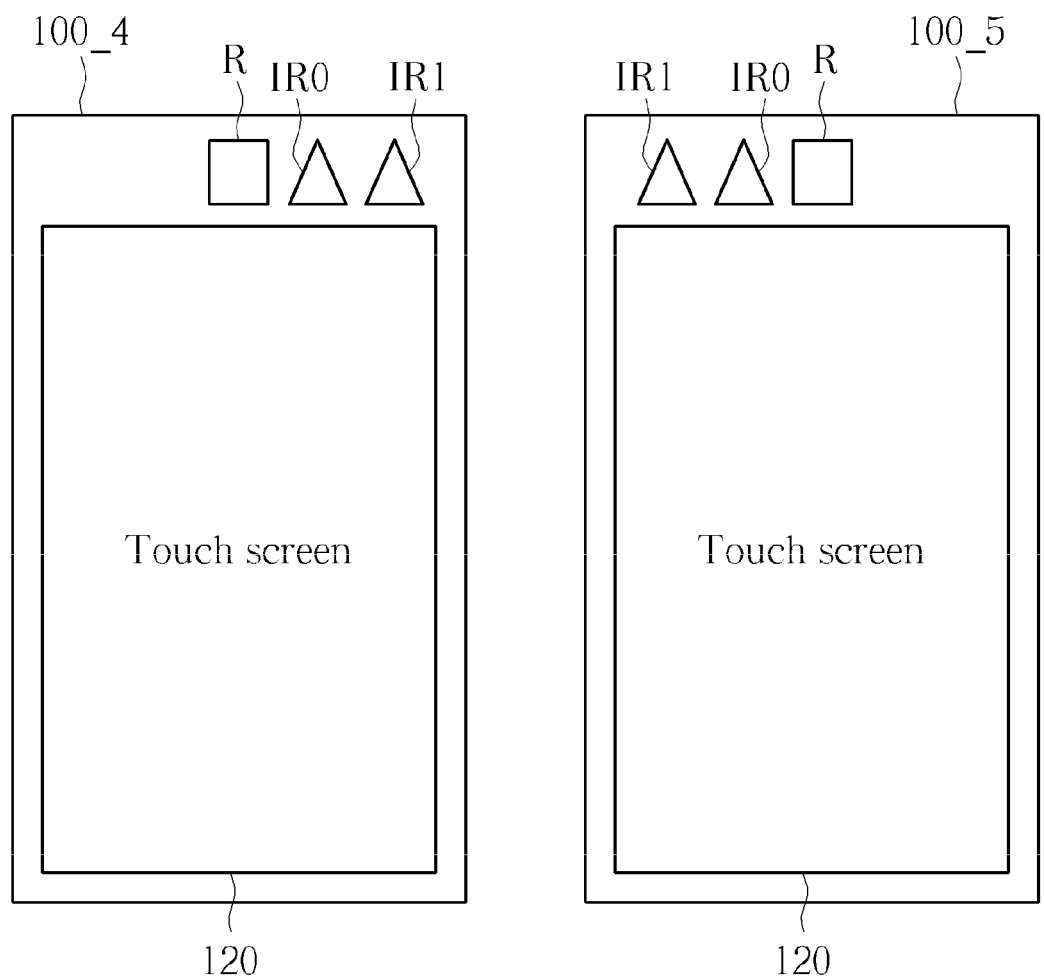
FIG. 4 is a diagram illustrating a second implementation of the IR emitters and the proximity sensor shown in FIG. 1.
Figure 5:
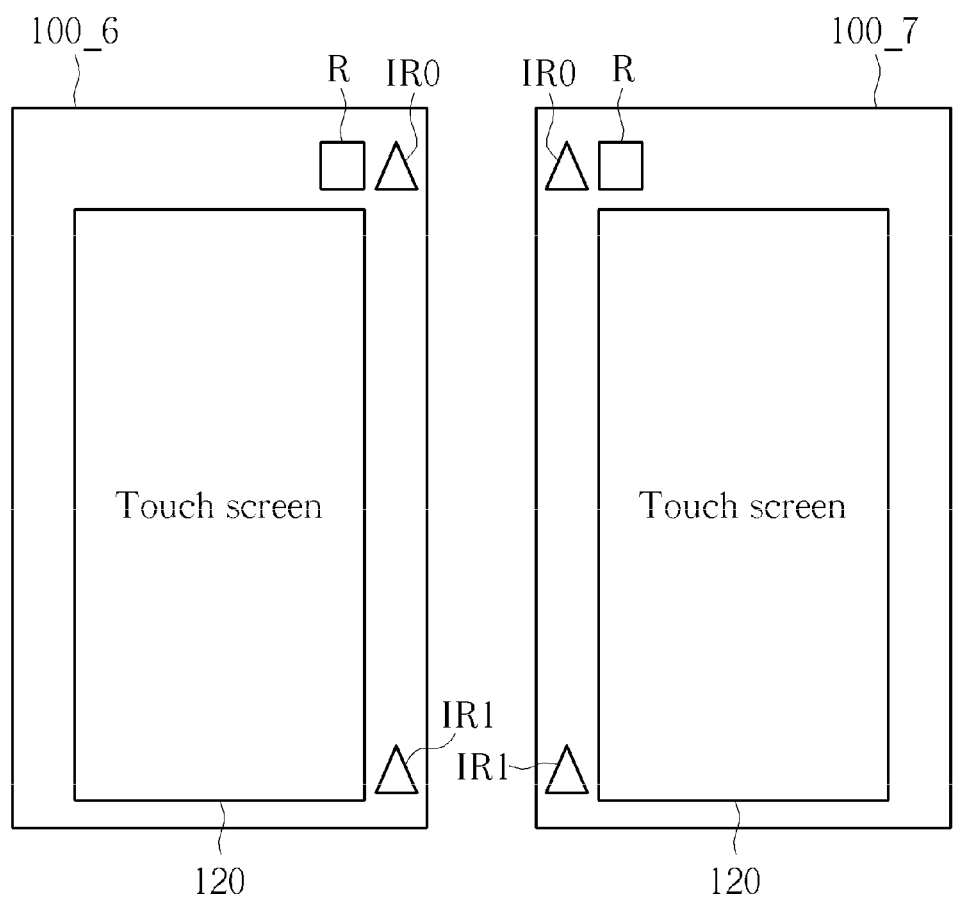
FIG. 5 is a diagram illustrating a third implementation of the IR emitters and the proximity sensor shown in FIG. 1.

It should be noted that the IR emitters IR0 and IR1 and the proximity sensor R shown in FIG. 1 may be disposed in the electronic apparatus 100 in different manners. Please refer to FIG. 3, FIG. 4 and FIG. 5. FIG. 3 is a diagram illustrating a first implementation of disposition of the IR emitters IR0 and IR1 and the proximity sensor R shown in FIG. 1. FIG. 4 is a diagram illustrating a second implementation of disposition of the IR emitters IR0 and IR1 and the proximity sensor R shown in FIG. 1, and FIG. 5 is a diagram illustrating a third implementation of disposition of the IR emitters IR0 and IR1 and the proximity sensor R shown in FIG. 1. For brevity and clarity, in the implementations shown in FIGS. 3-5, the IR emitters IR0 and IR1 shown in FIG. 1 are represented by triangular patterns (labeled IR0 and IR1, respectively), and the proximity sensor R shown in FIG. 1 is represented by a rectangular pattern (labeled R). The architectures of the electronic apparatus 100_1-100_7 are based on the architecture of the electronic apparatus 100, wherein the difference between the electronic apparatus 100_1-100_7 is the disposition of the IR emitters IR0 and IR1 and the proximity sensor R.

As shown in the left, middle and right sub-diagrams of FIG. 3, the IR emitters IR0 and IR1 and the proximity sensor R are disposed at the same side of the touch screen 120, wherein the proximity sensor R is disposed between the IR emitters IR0 and IR1. The distance between the proximity sensor R and the IR emitter IR0 may be longer than, equal to or shorter than the distance between the proximity sensor R and the IR emitter IR1. As shown in the left and right sub-diagrams of FIG. 4, the IR emitters IR0 and IR1 and the proximity sensor R are disposed at the same side of the touch screen 120, wherein the IR emitters IR0 and IR1 are disposed next to each other, and the proximity sensor R may be disposed at the leftmost or rightmost side. As shown in the left and right sub-diagrams of FIG. 5, the IR emitters IR0 and IR1 and the proximity sensor R may be disposed at different sides of the touch screen 120. In brief, as the proximity sensor R (i.e. the proximity sensor R shown in FIG. 1) is arranged to perform non-touch sensing by detecting the relationship between reflected signal intensity and time according to the positions of the IR emitters IR0 and IR1, the IR emitters IR0 and IR1 and the proximity sensor R may also be disposed in various manners in addition to those shown in FIGS. 3-5.

FIGS. 6-9 illustrate embodiments of the execution and control of a specific function of the electronic apparatus 100, respectively. Similarly, for brevity and clarity, in the embodiments shown in FIGS. 6-9, the IR emitters IR0 and IR1 shown in FIG. 1 are represented by triangular patterns (labeled IR0 and IR1, respectively), and the proximity sensor R shown in FIG. 1 is represented by a rectangular pattern (labeled R).

Figure 6:
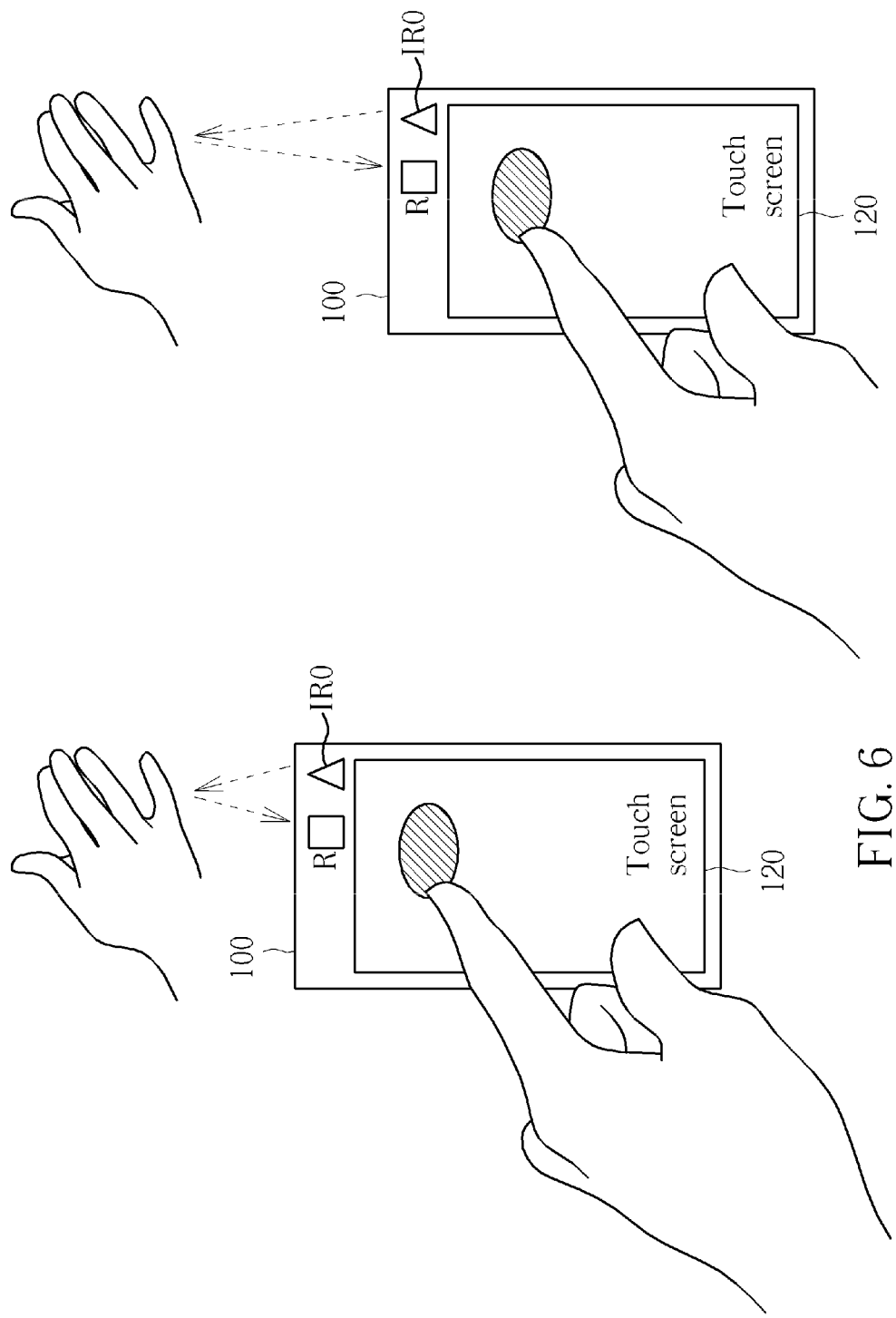
FIG. 6 is a diagram illustrating an exemplary execution control of a specific function of the electronic apparatus shown in FIG. 1 according to a first embodiment of the present invention.

Please refer to FIG. 6 in conjunction with FIG. 1. FIG. 6 is a diagram illustrating an exemplary execution control of a specific function of the electronic apparatus 100 shown in FIG. 1 according to a first embodiment of the present invention. In this embodiment, the user touches the touch screen 120 with a finger (e.g. a single tap) and performs a receding/approaching gesture above the touch screen 120, thereby enabling the electronic apparatus 100 to perform a display zooming function (e.g. a zoom in function or a zoom out function). More specifically, when the user taps the touch screen 120 once, the touch screen 120 may generate the touch detection result DR1 to the control unit 130, wherein the touch detection result DR1 may include touch position and motion information of the finger; when the user's other hand (the hand not touching the touch screen 120) moves away from the surface of the touch screen 120 (i.e. from the left sub-diagram to the right sub-diagram of FIG. 6), the proximity sensor R may generate the non-touch detection result DR2 to the control unit 130, wherein the non-touch detection result DR2 may include the relationship between time and reflected signal intensity corresponding to the IR emitter IR0 (e.g. the reflected signal intensity is gradually decreased). The control unit 130 may generate the control signal SC to the host 140 according to the touch detection result DR1 and the non-touch detection result DR2, thereby enabling the electronic apparatus 100 to perform the zoom out function. Similarly, when the user's finger taps the touch screen 120 once and the user's another hand gradually moves towards the surface of the touch screen 120 (i.e. from the right sub-diagram to the left sub-diagram of FIG. 6), the control unit 130 may enable the electronic apparatus 100 to perform the zoom in function according to the touch detection result DR1 and the non-touch detection result DR2.

In an alternative design, the user may touch the touch screen 120 with one finger and maintain contact over a specific period of time (i.e. a press-and-hold gesture) instead of tapping it once, and further perform the receding/approaching gesture above the touch screen 120 with the other hand to enable the electronic apparatus 100 to perform the display zooming function. In another alternative design, when the user touches a specific area on the touch screen 120 (represented by slanting lines) with a single-tap or press-and-hold gesture and performs the receding/approaching gesture above the touch screen 120 with the other hand, the electronic apparatus 100 may zoom in/out on the display by taking the specific area as the zooming center.

In one implementation, when the user's finger touches the touch screen 120 (e.g. a single-tap) and the user's other hand stays above the touch screen 120 (e.g. the situation shown in the left sub-diagram of FIG. 6) for a predetermined period of time, the display of the touch screen 120 may return to the home menu. In other words, the user may enable the electronic apparatus 100 to perform a home menu return function by performing a combined/combo gesture corresponding to a specific touch gesture and a specific non-touch gesture, which may save space reserved for physical buttons.

In the embodiment shown in FIG. 6, only an IR emitter is needed to detect the approaching/receding gesture. It is also feasible to employ a plurality of IR emitters to detect the approaching/receding gesture. In addition, the aforementioned specific function corresponding to the touch gesture (e.g. a single-tap gesture) and the non-touch gesture (e.g. the approaching/receding gesture) is for illustrative purposes only, and is not meant to be a limitation of the present invention. For example, the user may enable the electronic apparatus 100 to perform the zoom in function by taping the touch screen 120 once with a finger and performing the receding gesture above the touch screen 120 with the other hand.

Figure 7:
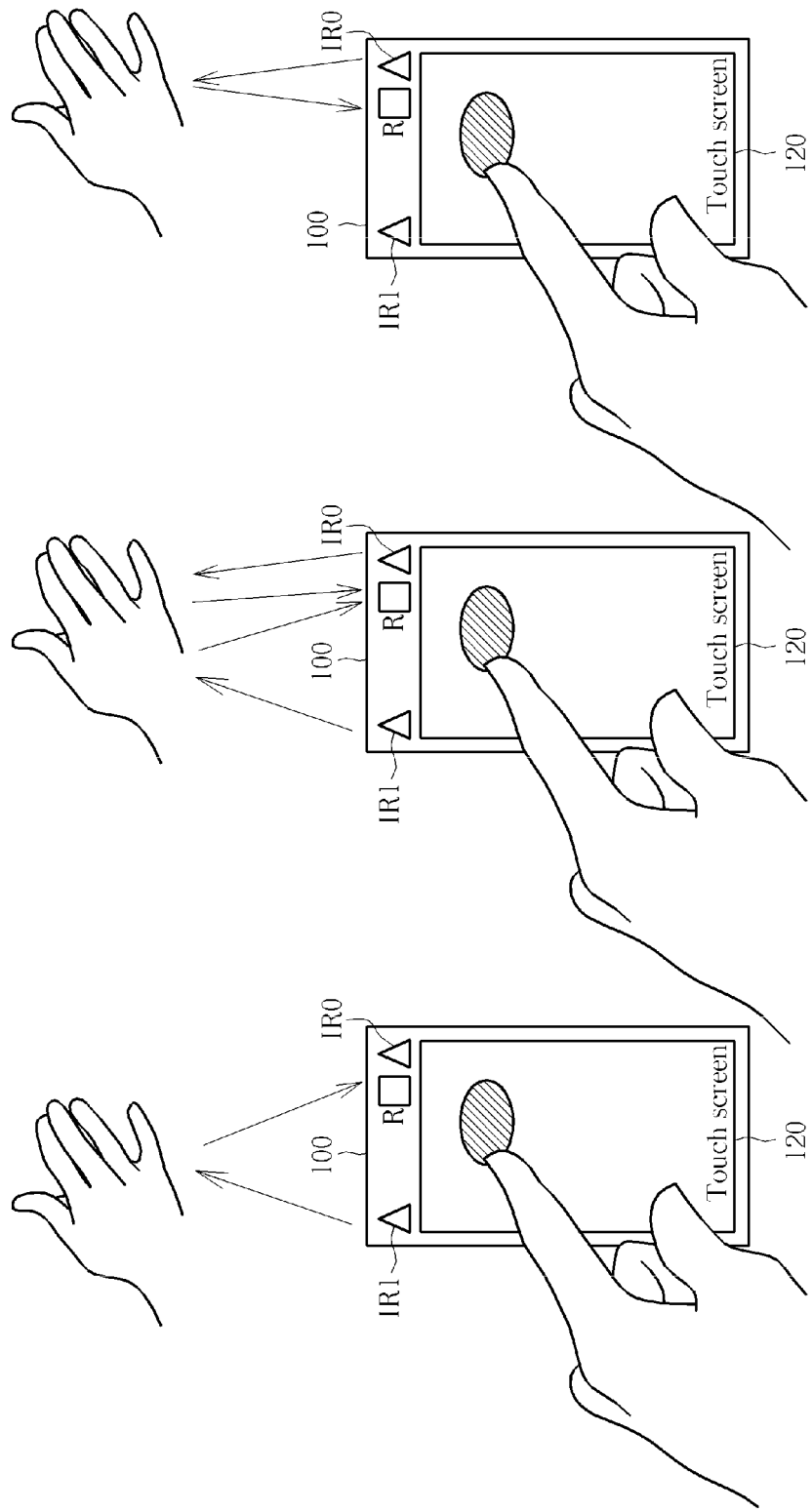
FIG. 7 is a diagram illustrating an exemplary execution control of a specific function of the electronic apparatus shown in FIG. 1 according to a second embodiment of the present invention.

Please refer to FIG. 7 in conjunction with FIG. 1. FIG. 7 is a diagram illustrating an exemplary execution control of a specific function of the electronic apparatus 100 shown in FIG. 1 according to a second embodiment of the present invention. In this embodiment, the user touches the touch screen 120 with a finger (e.g. a single tap) and performs a waving gesture above the touch screen 120 in order to enable the electronic apparatus 100 to perform a display zooming function. More specifically, when the user's hand moves from left to right above the touch screen 120 (i.e. from the left sub-diagram to the middle sub-diagram and then to the right sub-diagram of FIG. 7), the proximity sensor R may detect that the reflected signal intensity corresponding to the IR emitter IR1 (disposed at the left side of the proximity sensor R) is gradually decreased while the reflected signal intensity corresponding to the IR emitter IR0 (disposed at the right side of the proximity sensor R) is gradually increased. Hence, the control unit 130 may recognize that the user performs the single-tap touch gesture and the waving non-touch gesture (from left to right) to trigger the electronic apparatus 100. This combo gesture may enable the electronic apparatus 100 to perform the zoom in function. In addition, the user may perform the single-tap touch gesture and the waving non-touch gesture (from right to left) to trigger the electronic apparatus 100 in order to enable the electronic apparatus 100 to perform the zoom out function.

Please note that the above is for illustrative purposes only, and is not meant to be a limitation of the present invention. For example, in order to enable the electronic apparatus 100 to perform the zooming function, the user may press and hold the touch screen 120 with a finger instead of tapping it once and perform a waving gesture above the touch screen 120 with another hand.

In one implementation, the combo gesture corresponding to the contact gesture (e.g. the tapping gesture) and the waving gesture may be employed to the home menu return function and the last menu reverse function. For example, when the user triggers the electronic apparatus 100 by a single-tap touch gesture and a left-to-right hand-waving gesture (i.e. a non-touch gesture), the display of the touch screen 120 may revert to the previous display (i.e. the last menu); when the user triggers the electronic apparatus 100 by the single-tap touch gesture and a right-to-left hand-waving gesture, the display of the touch screen 120 may return to the home menu. Therefore, the disposition space of the physical buttons (i.e. the home menu button and the last menu button) may be saved.

In another implementation, the combo gesture corresponding to the contact gesture (e.g. the tapping gesture) and the waving gesture may be employed in the electronic book (e-book) reading mode of the electronic apparatus 100. When the electronic apparatus 100 operates in the e-book reading mode, the user may trigger the electronic apparatus 100 by a single-tap touch gesture and a left-to-right hand-waving gesture in order to turn pages forward. During the page turning period, the user may tap the touch screen 120 once again to stop the page turning operation. Similarly, the user may trigger the electronic apparatus 100 by the single-tap touch gesture and a right-to-left hand-waving gesture in order to turn the pages of the e-book backward. Please note that the speed/page of the e-book page turning may depend on the waving speed of the non-touch gesture.

In addition to the combo gesture (realized by the touch gesture and the non-touch gesture), the electronic apparatus may further refer to a temporal relationship between the touch gesture and the non-touch gesture to perform a variety of application functions. For example, in addition to the combo gesture corresponding to the contact gesture and waving gesture, the electronic apparatus 100 may further refer to a temporal relationship between the contact gesture and the waving gesture to perform a multimedia fast forward/rewind function. In a case where the electronic apparatus 100 operates in the video playback mode, when the user touches the touch screen 120 with a finger, the touch screen 120 may detect the finger touch time in addition to the finger touch position. Additionally, the user's other hand waves above the touch screen 120. The control unit 130 may determine a temporal relationship between the touch detection result DR1 and the non-touch detection result DR2. When it is determined that the temporal relationship meets a predetermined criterion, the control unit may enable the electronic apparatus 100 to perform the fast forward/rewind function.

In a case where the user presses and holds the touch screen 120 with a finger and performs a left-to-right waving gesture above the touch screen 120, the control unit 130 may determine whether the corresponding touch detection result DR1 and the non-touch detection result DR2 co-exist at a particular time point. If it is determined that the touch detection result DR1 and the non-touch detection result DR2 co-exist at the time point (i.e. the press-and-hold gesture and the waving gesture co-exist at the time point), the control unit 130 may enable the electronic apparatus 100 to perform the video fast forward/rewind function according to the touch detection result DR1 and the non-touch detection result DR2, wherein the time point at which the fast forward function starts corresponds to the time point at which the finger touches the touch screen 120. When the finger leaves the touch screen 120, the electronic apparatus 100 stops the fast forward function and the video playback speed returns to the normal speed. Similarly, when the user performs a press-and-hold gesture and a right-to-left waving gesture to trigger the electronic apparatus 100, the video will be rewound. Please note that the fast forward/rewind speed may depend on the waving speed of the non-touch gesture.

In an alternative design, the control unit 130 may determine whether a time interval between a generation time point of the touch detection result DR1 and a generation time point of the non-touch detection result DR2 is shorter than a predetermined time. When it is determined that the time interval is shorter than the predetermined time, the control unit 130 may enable the electronic apparatus 100 to perform the specific function (i.e. the fast forward function) according to the touch detection result DR1 and the non-touch detection result DR2. In other words, even if the contact gesture (e.g. the single-tap or the press-and-hold gestures) and the waving gesture do not co-exist at the time point, the control unit 130 may still enable the electronic apparatus 100 to perform the fast forward/rewind function as long as the time interval between the two gestures is short enough.

In another alternative design, the control unit 130 may determine a generation sequence of the touch detection result DR1 and the non-touch detection result DR2. When it is determined that the generation sequence meets a predetermined sequence (e.g. the touch detection result DR1 is generated before the non-touch detection result DR2), the control unit 130 may enable the electronic apparatus 100 to perform the specific function (i.e. the video fast forward function). In other words, as long as the user performs the waving gesture upon the electronic apparatus 100 after the contact gesture (e.g. the single-tap or press-and-hold gesture), the electronic apparatus 100 may perform the fast forward/rewind function. Please note that, if the user performs the contact gesture (e.g. the single-tap or press-and-hold gesture) upon the electronic apparatus 100 after the waving gesture, the electronic apparatus 100 may perform another specific function different from the fast forward/rewind function (e.g. skip to the next section or return to the previous section).

In view of the above description, the user may perform a touch gesture and a non-touch gesture simultaneously upon an electronic apparatus to generate a combined/combo gesture, and accordingly enable the electronic apparatus to perform a specific function. In addition, the user may first perform one of the touch gesture and the non-touch gesture upon the electronic apparatus, and then perform the other of the touch gesture and the non-touch gesture upon the electronic apparatus within a predetermined time in order to generate the combo gesture to enable the electronic apparatus to perform the specific function. Moreover, the user may generate different combo gestures according to different sequences of the touch gesture and the non-touch gesture in order to enable the electronic apparatus to perform different specific functions.

Figure 8:
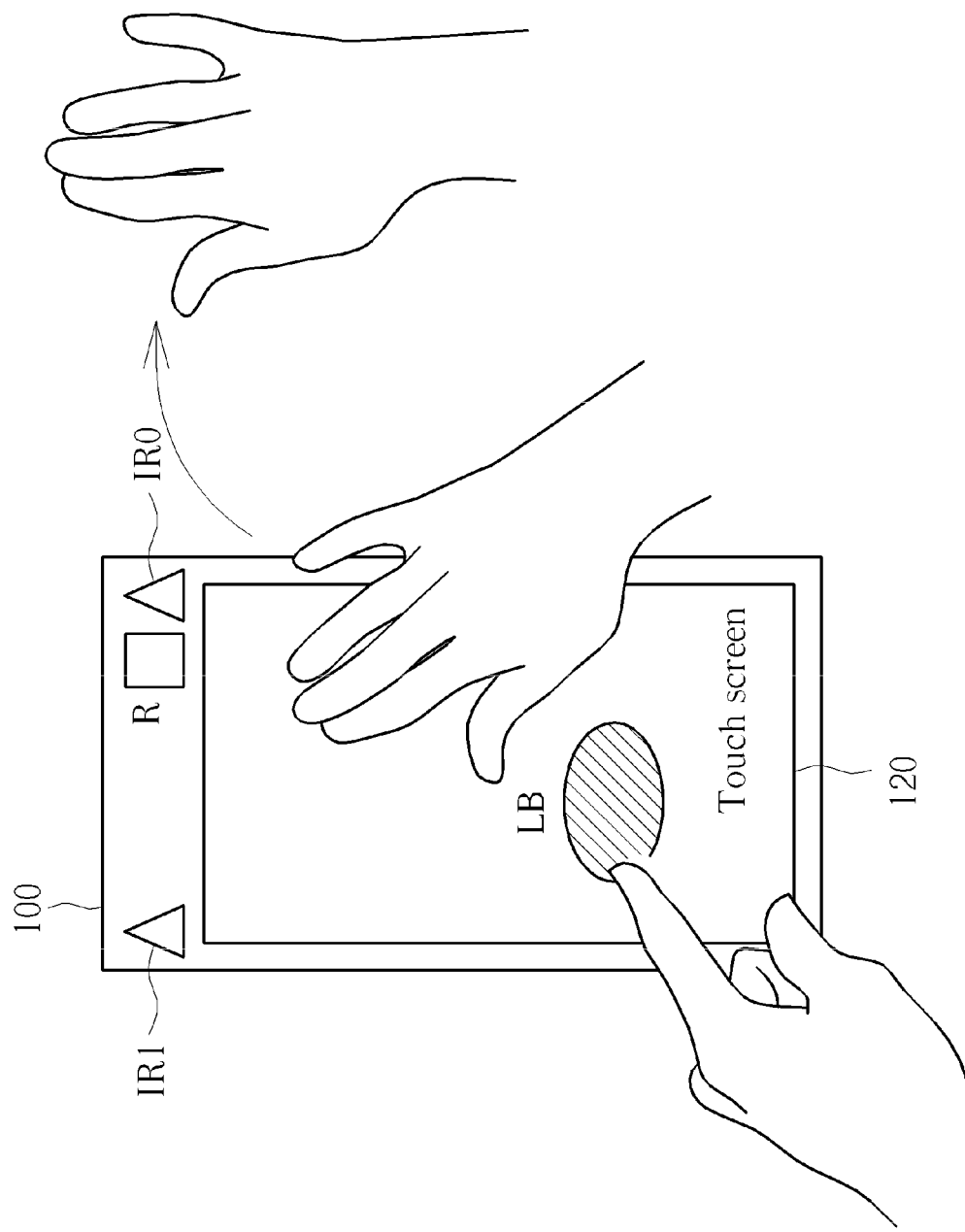
FIG. 8 is a diagram illustrating an exemplary execution control of a specific function of the electronic apparatus shown in FIG. 1 according to a third embodiment of the present invention.

Selecting a specific object displayed on the touch screen with a touch or non-touch gesture may also define a combo gesture, which may enable the electronic apparatus to perform a corresponding specific function. Please refer to FIG. 8 in conjunction with FIG. 1. FIG. 8 is a diagram illustrating an exemplary execution control of a specific function of the electronic apparatus 100 shown in FIG. 1 according to a third embodiment of the present invention. In this embodiment, when the electronic apparatus 100 enters a screen lock mode, the user may touch a specific object LB (e.g. an unlock object) on the touch screen 120 and perform a waving gesture above the touch screen 120 in order to enable the electronic apparatus 100 to perform the screen unlock function. It should be noted that the user may unlock the touch screen 120 by performing the waving gesture during selecting (e.g. pressing and holding) the specific object LB (i.e. the user's finger has not left the touch screen 120). In addition, the user may also unlock the touch screen 120 by performing the waving gesture within a predetermined time following the specific object LB selection (e.g. a single-tap selection), wherein the time measurement starts after the user's finger leaves the touch screen 120.

In one implementation, the user may drag an object on the touch screen 120 by performing a press-and-hold gesture and a waving gesture (a time interval between the two gestures is short than a predetermined time). For example, when the electronic apparatus 100 is in the game mode, the specific object LB is an object in the game. The user may first press and hold the specific object LB with a finger and then perform a waving gesture with another hand in order to drag the specific object LB. Each time the user's hand waves from left to right (or right to left), the specific object LB may move a specific distance in a corresponding direction, wherein the scale of the specific distance may depend on the waving speed. When the electronic apparatus 100 is in the audio playback mode, the user may also drag the specific object LB (e.g. a volume adjustment object) a specific distance by a press-and-hold gesture and a waving gesture in order to adjust the playback volume.

Figure 9:
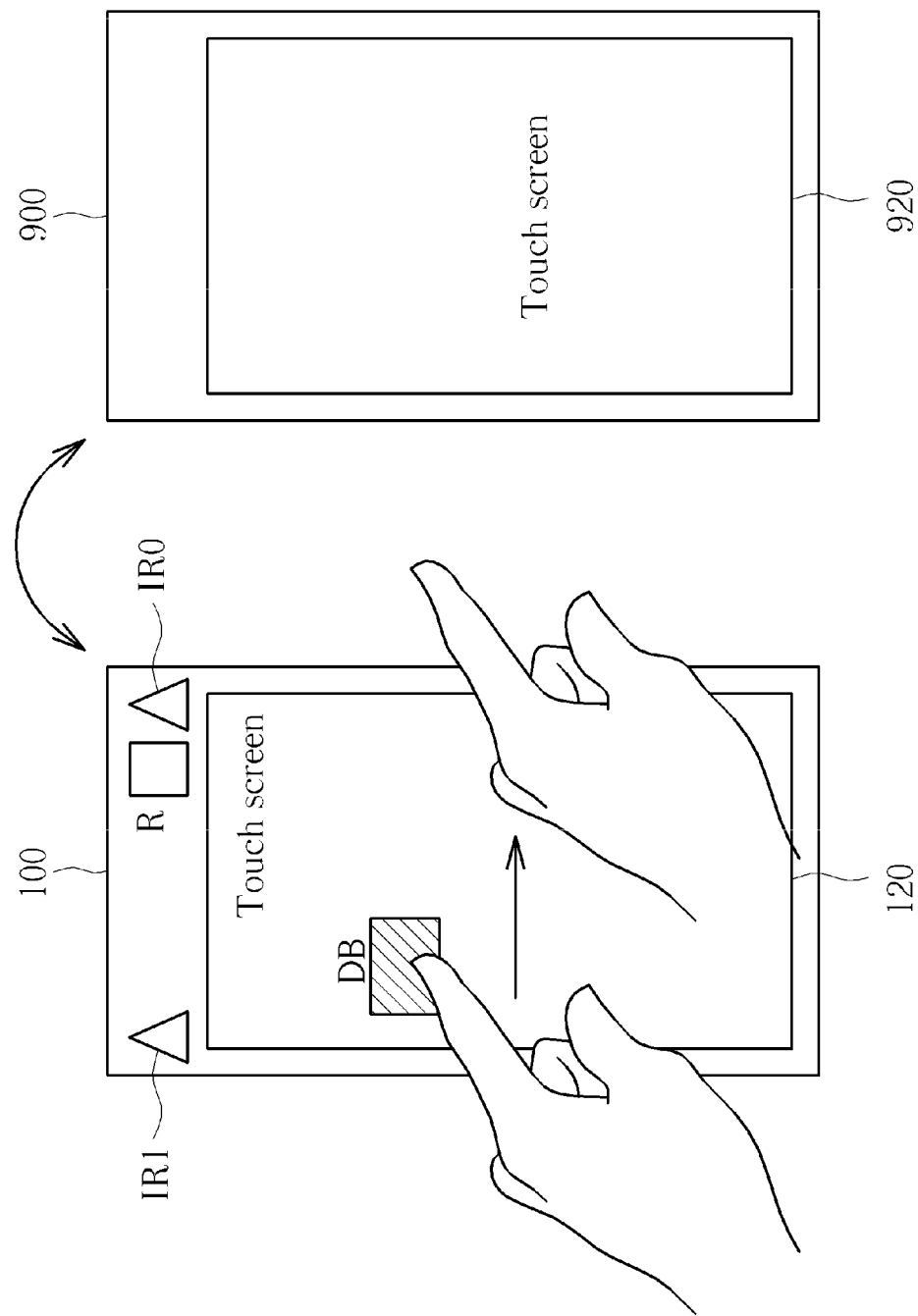
FIG. 9 is a diagram illustrating an exemplary execution control of a specific function of the electronic apparatus shown in FIG. 1 according to a fourth embodiment of the present invention.

Please refer to FIG. 9, which is a diagram illustrating an exemplary execution control of a specific function of the electronic apparatus 100 shown in FIG. 1 according to a fourth embodiment of the present invention. In this embodiment, the electronic apparatus 100 establishes a wireless communication link with an electronic apparatus 900, wherein the architecture of the electronic apparatus 900 is based on the electronic apparatus 100. The user may first select a file to be transferred (e.g. an object DB) on the touch screen 120 and then perform a waving gesture (e.g. toward the electronic apparatus 900) upon the electronic apparatus 100 within a predetermined time. Next, the file can be transferred to the electronic apparatus 900, and the corresponding transfer message may be displayed on the touch screen 920. Please note that the user may also enable the electronic apparatus 100 to perform the file transfer function by waving the hand toward the electronic apparatus 900 while selecting the object DB.

Figure 10:
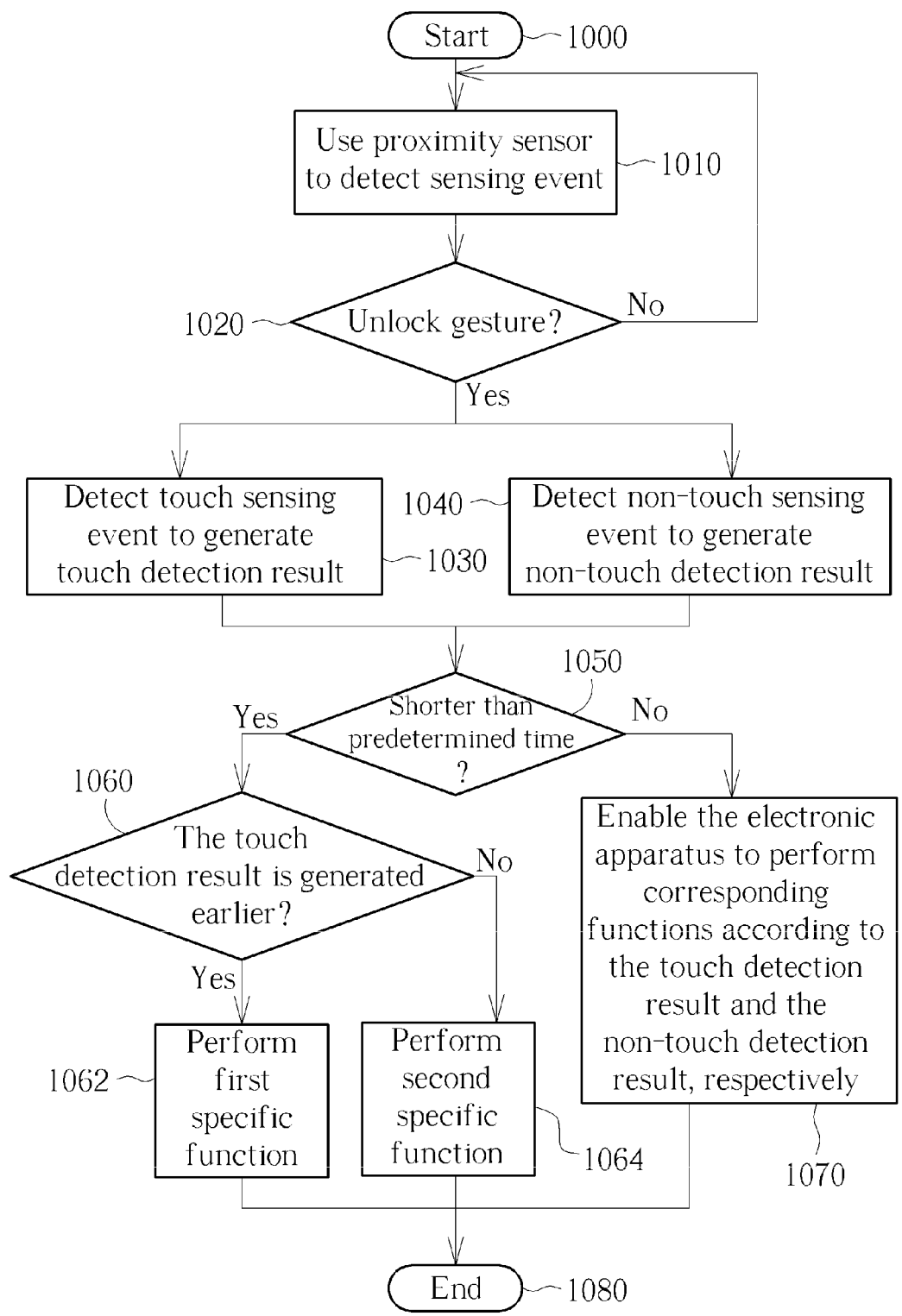
FIG. 10 is a flowchart of an exemplary control method of an electronic apparatus according to another embodiment of the present invention.

Please refer to FIG. 10, which is a flowchart of an exemplary control method of an electronic apparatus according to another embodiment of the present invention, wherein the exemplary may be employed in the electronic apparatus 100 shown in FIG. 1. In this embodiment, the electronic apparatus 100 is in the screen lock mode, and the user may enable the electronic apparatus 100 to perform the specific function according to the flow shown in FIG. 10. Provided that the results are substantially the same, steps are not required to be executed in the exact order shown in FIG. 10. The method may be summarized as follows.

Step 1000: Start.

Step 1010: Use the proximity sensor R to detect a sensing event.

Step 1020: Use the control unit 130 to recognize whether the sensing event corresponds to an unlock gesture (e.g. a top-to-bottom hand-waving gesture). If yes, go to step 1030 and step 1040; otherwise, return to step 1010.

Step 1030: Unlock the touch screen 120, and detect the touch sensing event SE1 (e.g. tapping the touch screen 120 once) to generate the touch detection result DR1.

Step 1040: Unlock the touch screen 120, and detect the non-touch sensing event SE2 (e.g. performing a waving gesture above the touch screen 120) to generate the non-touch detection result DR2.

Step 1050: Determine whether a time interval between a generation time point of the touch detection result DR1 and a generation time point of the non-touch detection result DR2 is shorter than a predetermined time. If yes, go to step 1060; otherwise, go to step 1070.

Step 1060: Determine a generation sequence of the touch detection result DR1 and the non-touch detection result DR2. If it is determined that the touch detection result DR1 is generated before the non-touch detection result DR2, go to step 1062; if it is determined that the touch detection result DR1 is generated after the non-touch detection result DR2, go to step 1064.

Step 1062: Enable the electronic apparatus 100 to perform a first specific function according to the touch detection result DR1 and the non-touch detection result DR2.

Step 1064: Enable the electronic apparatus 100 to perform a second specific function according to the touch detection result DR1 and the non-touch detection result DR2, wherein the second specific function is different from the first specific function.

Step 1070: Enable the electronic apparatus 100 to perform corresponding functions according to the touch detection result DR1 and the non-touch detection result DR2, respectively.

Step 1080: End.

In this embodiment, in order to describe that the electronic apparatus 100 may be controlled by a variety of gestures (e.g. a touch gesture, a non-touch gesture and/or a combo gesture), a specific non-touch gesture (e.g. a bottom-to-top hand-waving gesture) is defined as an unlock gesture, and the proximity sensor R is employed for detection in step 1010. When recognizing that the sensing event corresponds to the unlock gesture (in step 1020), the control unit 130 may enable the electronic apparatus 100 to perform the screen unlock function. Next, the touch screen 120 and the proximity sensor R may start to detect the touch sensing event SE1 and the non-touch sensing event SE2 to generate the corresponding detection results (in steps 1030 and 1040). When determining that the time interval is shorter than the predetermined time, the control unit 130 may determine the generation sequence of the touch detection result DR1 and the non-touch detection result DR2, and accordingly enable the electronic apparatus 100 to perform different functions (in steps 1060, 1062 and 1064). For example, if the touch detection result DR1 (e.g. a single-tap detection result) is generated before the non-touch detection result DR2 (e.g. a waving detection result) and the time interval is shorter than the predetermined time (e.g. one second), the first specific function is the display zooming function; if the non-touch detection result DR2 (e.g. the waving detection result) is generated before the touch detection result DR1 (e.g. the single-tap detection result) and the time interval is shorter than the predetermined time, the first specific function is the home menu return function. In an alternative design, the control unit 130 may first determine the aforementioned generation sequence and then determine if the time interval is shorter than the predetermined time. When the time interval is shorter than the predetermined time, the control unit 130 may enable the electronic apparatus 100 to perform the corresponding specific function according to the touch detection result DR1, non-touch detection result DR2 and the generation sequence.

In step 1070, as the time interval is longer than the predetermined time, the control unit 130 does not recognize the touch detection result DR1 and non-touch detection result DR2 as a specific combo gesture. Thus, the control unit 130 may enable the electronic apparatus 100 to perform the corresponding functions according to the touch detection result DR1 and the non-touch detection result DR2.

The aforementioned correspondence between the combo gesture and the specific function is for illustrative purposes only, and is not meant to be a limitation of the present invention. For example, touch gestures may include, but are not limited to, a single-tap, double-tap, press-and-hold, drag, zoom-in/out and rotation (e.g. drawing an arc with one finger as a center thereof and another finger as a point thereon) motions. Non-touch gestures may include, but are not limited to, a single-tap, double-tap, hold, drag, zoom-in/out and rotation (e.g. one proximity sensor and three IR emitters are used, or three proximity sensors and one IR emitter are used) motions. The user may employ any touch gesture and any non-touch gesture to realize a combo gesture, and accordingly enable the electronic apparatus to perform the specific function.

Figure 11:
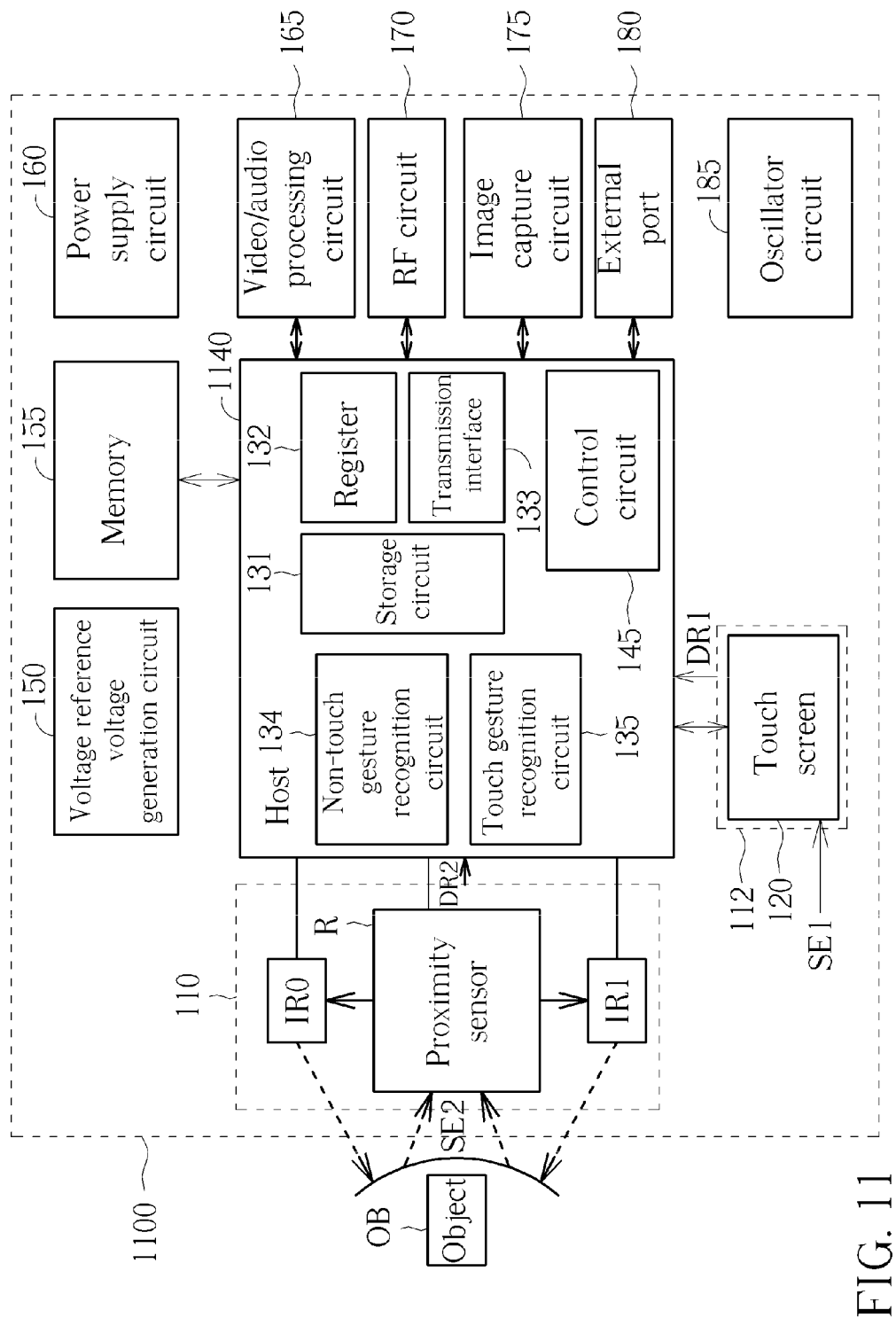
FIG. 11 is a block diagram illustrating an exemplary electronic apparatus according to another embodiment of the present invention.

Please refer to FIG. 11, which is a block diagram illustrating an exemplary electronic apparatus according to another embodiment of the present invention. The architecture of the electronic apparatus 1100 is based on that of the electronic apparatus 100, wherein the difference is that the control unit 130 and the host 140 included in the electronic apparatus 100 are integrated into the host 1140 included in the electronic apparatus 1100. Similarly, the electronic apparatus 1100 may eliminate valuable circuit board space, reduce communication overhead, and have the advantages of low production cost, fast report rate and high operating efficiency. As a person skilled in the art can readily understand the operation of the electronic apparatus 1100 shown in FIG. 11 after reading the paragraphs directed to FIGS. 1-10, further description is omitted here for brevity.

To sum up, the present invention provides an electronic apparatus integrating touch sensing with non-touch sensing and a control method thereof. The proposed method can enable the electronic apparatus to perform a variety of functions according to combo gestures realized by touch gestures and non-touch gestures, to thereby save space otherwise occupied by physical buttons. In addition, the integration of the touch sensor controller with the non-touch sensor controller can greatly reduce the production cost and improve the operating efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an electronic apparatus, comprising:
   detecting a touch sensing event to generate a touch detection result;
   detecting a non-touch gesture sensing event to generate a non-touch gesture detection result;
   enabling the electronic apparatus to perform a specific function according to at least the touch detection result and the non-touch gesture detection result; and
   determining a generation sequence of the touch detection result and the non-touch gesture detection result;
   wherein the step of enabling the electronic apparatus to perform the specific function according to at least the touch detection result and the non-touch gesture detection result comprises enabling the electronic apparatus to perform the specific function according to the touch detection result, the non-touch gesture detection result and the generation sequence;
   wherein when it is determined that one of the touch detection result and the non-touch gesture detection result is generated before the other of the touch detection result and the non-touch gesture detection result, the specific function performed by the electronic apparatus is a first specific function, and when it is determined that one of the touch detection result and the non-touch gesture detection result is generated after the other of the touch detection result and the non-touch gesture detection result, the specific function performed by the electronic apparatus is a second specific function different from the first specific function.

2. The control method of claim 1, wherein when the touch detection result corresponds to a single-tap gesture or a press-and-hold gesture, and the non-touch gesture detection result corresponds to one of a receding gesture and an approaching gesture, the specific function performed by the electronic apparatus is a display zooming function.

3. The control method of claim 1, wherein when the touch detection result corresponds to a single-tap gesture and the non-touch gesture detection result corresponds to a hold gesture, the specific function performed by the electronic apparatus is a home menu return function.

4. The control method of claim 1, wherein when the touch detection result corresponds to a single-tap gesture and the non-touch gesture detection result corresponds to a waving gesture, the specific function performed by the electronic apparatus is a display zooming function, a home menu return function, a last menu reverse function, a page turning function or a file transfer function.

5. The control method of claim 1, wherein when the touch detection result corresponds to a press-and-hold gesture and the non-touch gesture detection result corresponds to a waving gesture, the specific function performed by the electronic apparatus is a display zooming function, a multimedia fast forward function or a multimedia rewind function.

6. The control method of claim 1, wherein when the touch detection result corresponds to a gesture touching a specific object and the non-touch gesture detection result corresponds to a waving gesture, the specific function performed by the electronic apparatus is a screen unlock function.

7. The control method of claim 1, wherein the step of enabling the electronic apparatus to perform the specific function according to at least the touch detection result and the non-touch gesture detection result comprises:
   recognizing the touch detection result to generate a touch gesture recognition result;
   recognizing the non-touch gesture detection result to generate a non-touch gesture recognition result; and
   enabling the electronic apparatus to perform the specific function according to at least the touch gesture recognition result and the non-touch gesture recognition result.

8. The control method of claim 7, wherein when the touch detection result corresponds to a single-tap gesture or a press-and-hold gesture, and the non-touch gesture detection result corresponds to one of a receding gesture and an approaching gesture, the specific function performed by the electronic apparatus is a display zooming function.

9. The control method of claim 7, wherein when the touch detection result corresponds to a single-tap gesture and the non-touch gesture detection result corresponds to a hold gesture, the specific function performed by the electronic apparatus is a home menu return function.

10. The control method of claim 7, wherein when the touch detection result corresponds to a single-tap gesture and the non-touch gesture detection result corresponds to a waving gesture, the specific function performed by the electronic apparatus is a display zooming function, a home menu return function, a last menu reverse function, a page turning function or a file transfer function.

11. The control method of claim 7, wherein when the touch detection result corresponds to a press-and-hold gesture and the non-touch gesture detection result corresponds to a waving gesture, the specific function performed by the electronic apparatus is a display zooming function, a multimedia fast forward function or a multimedia rewind function.

12. The control method of claim 7, wherein when the touch detection result corresponds to a gesture touching a specific object and the non-touch gesture detection result corresponds to a waving gesture, the specific function performed by the electronic apparatus is a screen unlock function.

13. The control method of claim 1, further comprising:
determining whether the touch detection result and the non-touch gesture detection result co-exist at a time point;
wherein only when it is determined that the touch detection result and the non-touch gesture detection result co-exist at the time point, the step of enabling the electronic apparatus to perform the specific function according to at least the touch detection result and the non-touch gesture detection result is executed.

14. The control method of claim 1, further comprising:
determining if a time interval between a generation time point of the touch detection result and a generation time point of the non-touch gesture detection result is shorter than a predetermined time;
wherein only when it is determined that the time interval is shorter than the predetermined time, the step of enabling the electronic apparatus to perform the specific function according to at least the touch detection result and the non-touch gesture detection result is executed.

15. The control method of claim 14,
wherein when the touch detection result corresponds to a press-and-hold gesture and the non-touch gesture detection result corresponds to a waving gesture, the specific function performed by the electronic apparatus is an object dragging function.

16. An electronic apparatus, comprising:
a touch detection unit, for detecting a touch sensing event to generate a touch detection result;
a non-touch detection unit, for detecting a non-touch gesture sensing event to generate a non-touch gesture detection result; and
a control unit, coupled to the touch detection unit and the non-touch detection unit, for enabling the electronic apparatus to perform a specific function according to at least the touch detection result and the non-touch gesture detection result, and determining a generation sequence of the touch detection result and the non-touch gesture detection result;
wherein enabling the electronic apparatus to perform the specific function according to at least the touch detection result and the non-touch gesture detection result comprises the control unit enabling the electronic apparatus to perform the specific function according to the touch detection result, the non-touch gesture detection result and the generation sequence;
wherein when the control unit determines that one of the touch detection result and the non-touch gesture detection result is generated before the other of the touch detection result and the non-touch gesture detection result, the specific function performed by the electronic apparatus is a first specific function, and when the control unit determines that one of the touch detection result and the non-touch gesture detection result is generated after the other of the touch detection result and the non-touch gesture detection result, the specific function performed by the electronic apparatus is a second specific function different from the first specific function.

17. The electronic apparatus of claim 16, wherein the control unit comprises:
a touch gesture recognition unit, coupled to the touch detection unit, for recognizing the touch detection result to generate a touch gesture recognition result;
a non-touch gesture recognition unit, coupled to the non-touch detection unit, for recognizing the non-touch gesture detection result to generate a non-touch gesture recognition result; and
wherein the control unit enables the electronic apparatus to perform the specific function according to at least the touch gesture recognition result and the non-touch gesture recognition result.

* * * * *